United States Patent
Chiu et al.

(10) Patent No.: US 7,576,817 B2
(45) Date of Patent: Aug. 18, 2009

(54) LIQUID CRYSTAL DISPLAY HAVING PARTICULAR METAL LAYER

(75) Inventors: Chun-Chang Chiu, Taoyuan County (TW); Wen-Yi Syu, Taoyuan County (TW); Kuan-Yi Lee, Taoyuan County (TW)

(73) Assignee: AU Optronics Corp., Hsinchu (TW)

( * ) Notice: Subject to any disclaimer, the term of this patent is extended or adjusted under 35 U.S.C. 154(b) by 587 days.

(21) Appl. No.: 11/427,056

(22) Filed: Jun. 28, 2006

(65) Prior Publication Data

US 2007/0002197 A1 Jan. 4, 2007

(30) Foreign Application Priority Data

Jun. 29, 2005 (TW) .............................. 94121854 A

(51) Int. Cl.
*G02F 1/1335* (2006.01)
*G02F 1/136* (2006.01)

(52) U.S. Cl. .......................... 349/114; 349/43; 349/113

(58) Field of Classification Search ................. 349/114, 349/43, 113
See application file for complete search history.

(56) References Cited

U.S. PATENT DOCUMENTS

| | | | |
|---|---|---|---|
| 6,522,376 B1 * | 2/2003 | Park et al. | 349/113 |
| 6,674,496 B2 * | 1/2004 | Wei | 349/63 |
| 6,680,765 B1 * | 1/2004 | Maeda et al. | 349/117 |
| 6,873,383 B1 | 3/2005 | Maeda et al. | |
| 7,092,055 B2 | 8/2006 | Maeda et al. | |
| 2003/0117552 A1 * | 6/2003 | Chae | 349/113 |
| 2005/0094067 A1 | 5/2005 | Sakamoto et al. | |
| 2006/0209236 A1 | 9/2006 | Maeda et al. | |

FOREIGN PATENT DOCUMENTS

| | | |
|---|---|---|
| CN | 1263608 | 8/2000 |
| CN | 1138173 | 2/2004 |
| CN | 1542528 | 11/2004 |

OTHER PUBLICATIONS

China Office Action mailed Aug. 3, 2007.

* cited by examiner

*Primary Examiner*—Mike Qi
(74) *Attorney, Agent, or Firm*—Thomas, Kayden, Horstemeyer & Risley

(57) ABSTRACT

A liquid crystal display comprises a substrate comprising a thin film transistor area and a pixel area, a gate line formed on the substrate, a gate dielectric layer formed on the gate line and the substrate, an active layer formed on the gate dielectric layer, a doped layer formed on the active layer, a metal layer formed on the doped layer, a passivation layer overlaying the thin film transistor area and the pixel area, and a pixel electrode layer formed on the passivation layer. The gate line, the gate dielectric layer, the active layer, the doped layer and the metal layer in the thin film transistor area constitute a thin film transistor. The metal layer in the pixel area comprises a contact portion and a metal portion which is thick enough to partially transmit and partially reflect incident light to form a transflective region.

22 Claims, 3 Drawing Sheets

United States Patent US 7,576,817 B2

LIQUID CRYSTAL DISPLAY HAVING PARTICULAR METAL LAYER

BACKGROUND

The invention relates to a liquid crystal display, and in particular to a reflective liquid crystal display.

Reflective liquid crystal displays (RLCDs) are classified into two main types, reflective and transflective. The reflective type utilizes external light with a reflector on the LCD panel. The reflective type is power saving, but cannot operate without an external light source or when there is insufficient external light intensity. In such a condition, an auxiliary light source is required. The transflective type uses backlight as a light source when the external light is insufficient. As the transflective type is power saving and provided with an auxiliary light source (the backlight), it is widely used in mobile phones and personal digital assistants (PDAs).

FIG. 1 is a schematic view of a conventional transflective LCD structure. The conventional transflective LCD structure comprises a bottom substrate 100, an insulated layer 110 formed on the bottom substrate 100, a pixel area 165 formed on the insulated layer 110, a top substrate 160 corresponding to the bottom substrate 100, a color filter 150 formed on the inner surface of the top substrate 160, a polarizing layer 180 formed on the outer surface of the top substrate 160, a common electrode 140 formed on the color filter 150, a liquid crystal layer 130 between the bottom substrate 100 and the top substrate 160, a polarizing layer 190 formed on the outer surface of the bottom substrate 100, and a reflective layer 120 sandwiched between the polarizing layer 190 and the bottom substrate 100. Typically, tens or hundreds of angstroms of aluminum is plated on the polarizing layer 190 to form the reflective layer 120.

In the described structure, however, as incident light 170 passes through the bottom substrate 100, aberrations might be then introduced when transmit light and reflected light reach different pixels 165.

SUMMARY

The present invention discloses a liquid crystal display, which comprises: a substrate comprising a thin film transistor area and a pixel area; a gate line formed on the substrate; a gate dielectric layer formed on the gate line and the substrate; an active layer formed on the gate dielectric layer; a doped layer formed on the active layer; a metal layer formed on the doped layer; a passivation layer overlaying the thin film transistor area and the pixel area, and a pixel electrode layer formed on the passivation layer. The gate line, the gate dielectric layer, the active layer, the doped layer and the metal layer in the thin film transistor area constitute a thin film transistor. The metal layer in the pixel area comprises a contact portion and a metal portion which is thick enough to allow the incident light partially to pass therethrough and partially reflect the incident light to form a transflective region.

The thin film transistor area comprises a source/drain region and a channel region in which the passivation layer is formed directly on the active layer by etching the metal layer and the doped layer. The passivation layer has an opening formed on the contact portion to reveal the metal layer, and the pixel electrode layer is formed directly on the metal layer in the opening.

The metal layer in the metal portion is thinner than the metal layer in the contact portion.

The metal layer comprises a first metal layer and a second metal layer, and the second metal layer in the metal portion is removed by etching leaving only the first metal layer. The first metal layer comprises Ti, TiN and Mo, and the second metal layer comprises Al or AlNd.

The metal layer in the source/drain region is as thick as the metal layer in the contact region.

The surface of the metal layer reflecting incident light in the transflective region is tooth-shaped.

Another embodiment of a liquid crystal display comprises: a substrate comprising a thin film transistor area and a pixel area; a gate line formed on the substrate; a gate dielectric layer formed on the gate line and the substrate; an active layer formed on the gate dielectric layer; a doped layer formed on the active layer; a metal layer formed on the doped layer; a passivation layer overlaying the thin film transistor area and the pixel area; and a pixel electrode layer formed on the passivation layer. The gate line, the gate dielectric layer, the active layer, the doped layer and the metal layer in the thin film transistor area constitute a thin film transistor. The pixel area comprises a contact portion, a transparent portion in which the gate dielectric layer is revealed and a reflective region in which the metal layer is thick enough to reflect incident light.

The surface of the metal layer in the reflective region is tooth-shaped.

Another embodiment of a liquid crystal display comprises: a substrate comprising a thin film transistor area and a pixel area; a gate line formed on the substrate; a gate dielectric layer formed on the gate line and the substrate; an active layer formed on the gate dielectric layer; a doped layer formed on the active layer; a metal layer formed on the doped layer; a passivation layer overlaying the thin film transistor area and the pixel area, and a pixel electrode layer formed on the passivation layer. The gate line, the gate dielectric layer, the active layer, the doped layer and the metal layer in the thin film transistor area constitute a thin film transistor. The metal layer in the pixel area comprises a contact portion and a metal portion which is thick enough to reflect incident light to form a reflective region.

The surface of the metal layer in the reflective region is tooth-shaped.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
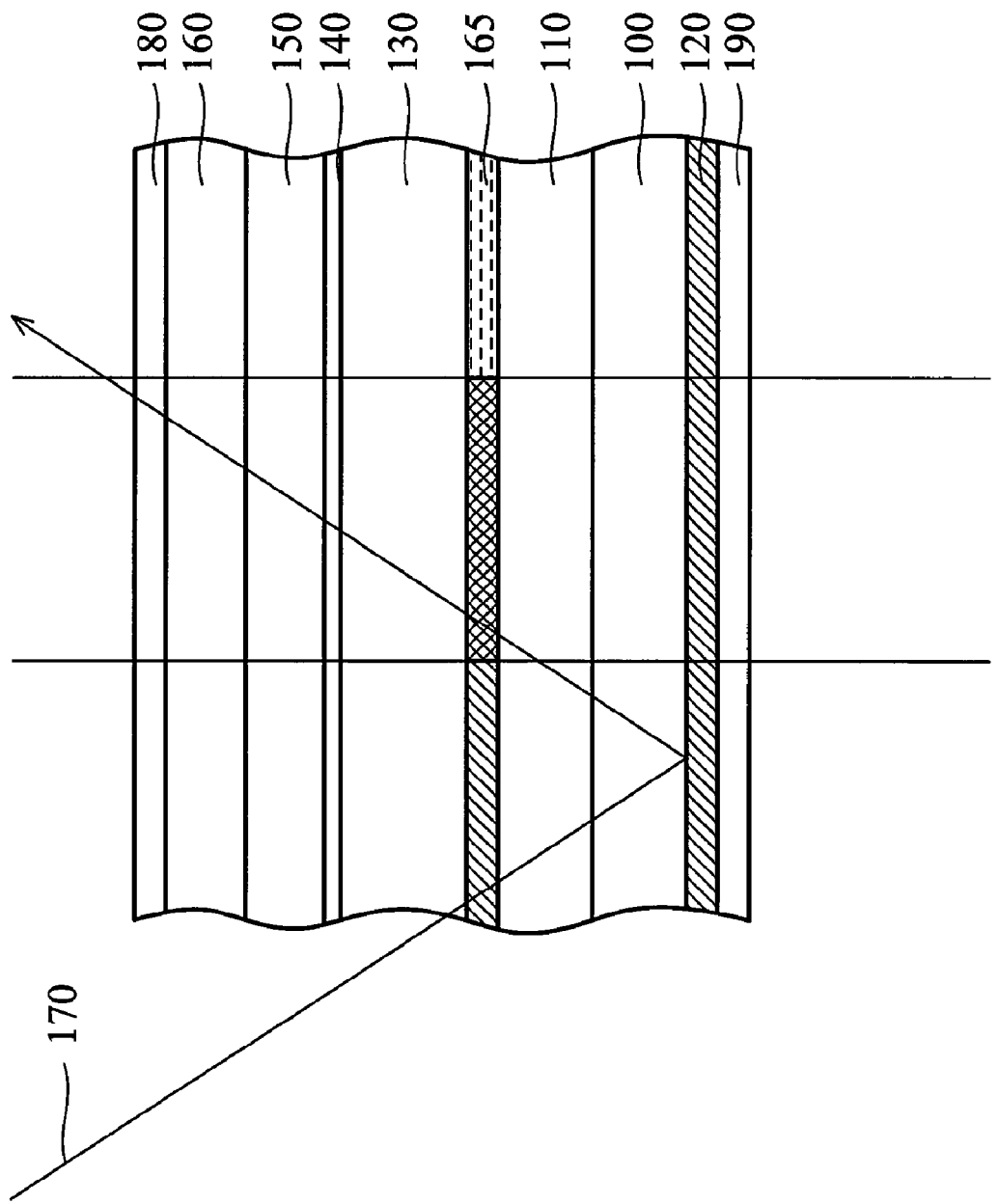
FIG. 1 is a schematic view of a conventional transflective liquid crystal display.
Figure 2:
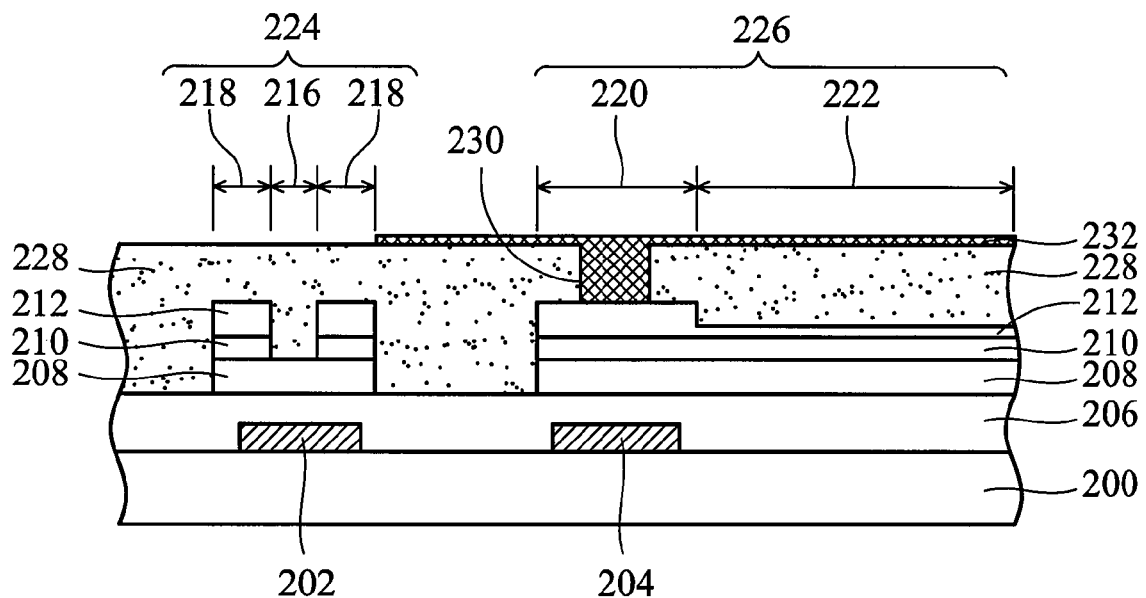
FIG. 2 is a schematic view of an embodiment of a liquid crystal display.

Referring to FIG. 2, a primitive metal layer (not shown) is formed on a substrate 200 by deposition. The primitive metal layer can be a monolayer, such as comprising Al or Mo, or an alloy comprising AlNd. Additionally, the primitive metal layer can be dual or multiple layers, such as Ti/Al, TiN/Al, Mo/Al, Ti/Al/TiN or Ti/AlNd. Preferably, the primitive metal layer is a stacked layer of Ti/Al/TiN. The described deposition method can be the chemical vapor deposition or the physical vapor deposition.

The primitive metal layer is patterned by conventional photolithography and etching technology to form a gate line 202 and a storage capacitor line 204. A gate dielectric layer 206, an active layer 208, a doped layer 210 and a metal layer 212 are formed on the substrate 200, the gate line 202 and the storage capacitor 204 sequentially by deposition. Conventional or novel deposition technologies can be applied to the described deposition, such as chemical vapor deposition, physical vapor deposition or atomic layer deposition.

The gate dielectric layer 206 can be silicon oxide, silicon nitride, silicon oxynitride, the combination thereof or stacked layer thereof. The active layer 208 can comprise semiconductor, such as silicon or germanium. The doped layer 210 can be a doped semiconductor, such as an n-type polysilicon doped with phosphorous or an n-type polysilicon doped with arsenic to reduce contact resistance between the metal layer 212 and the active layer 208. The metal layer 212 can be monolayer, such as comprising Al, Mo, or an alloy, such as AlNd, or multiple layers, such as Ti/Al, TiN/Al, mo/Al or Ti/AlNd. Preferably, the metal layer 212 is a stacked layer of TiN/Al.

Next, as shown in FIG. 2, the active layer 208, the doped layer 210 and the metal layer 212 are etched. The liquid crystal display structure comprises a thin transistor area 224 and a pixel area 226.

The thin transistor area 224 comprises a channel region 216 and a source/drain region 218. The channel region 216 is an opening in which the doped layer 210 and the metal layer 212 is removed by etching to reveal the active layer 208.

The pixel area 226 comprises a contact portion 220 and a metal portion 222. In this embodiment, the metal layer 212 in the metal portion 222 is etched to be thinner than the metal layer 212 in the contact portion 220, but the metal layer 212 in the contact portion 220 is as thick as the metal layer 212 in the source/drain region 218. As incident light is totally reflected by a metal layer of a sufficient thickness, the thickness of metal layer 212 must be considered if incident light is required to partially pass through and be partially reflected by the metal layer 212. For example, while metal layer of TiN is less than 50 angstroms, the transmittance is more than 50%, and reflectivity is about 20%, and while the metal layer of Ti is less than 50 angstroms, the transmittance is about 40% and reflectivity is about 30%. When the thickness of the metal layer 212 in the metal portion 222 is reduced to a specific value, the incident light can partially pass through and be partially reflected by the metal layer 212. For example, a Ti layer of 50 to 200 angstroms or a TiN layer of 50 to 200 angstroms can be used. The metal layer 212 can be two layers comprising a first metal layer and a second metal layer. The second metal layer in the metal portion 222 is removed by etching, and the first metal layer is reserved, whereby the incident light can partially pass through and partially be reflected by the metal layer 212. The first metal layer can comprise Ti, TiN and Mo, and the second metal layer can comprise Al or AlNd.

Next, a passivation layer 228 (silicon nitride layer) is formed by deposition to overlay the gate dielectric layer 206, the etched metal layer 212 and the active layer 208. The passivation layer 228 is patterned by conventional photolithography and etching processes to form an opening 230 in the contact portion 220. A pixel electrode layer, such as ITO, is formed on the passivation layer 228 and filled in the opening 230 for electrical connection. Finally, the pixel electrode layer is patterned to act as the pixel electrode 232 of the liquid crystal display.

In the described structure, as the metal layer 212 reflecting incident light is disposed between the substrate 200 and the pixel electrode 232, incident light does not pass through the substrate 200. Thus, the aberration problem can be avoided.

Figure 3:
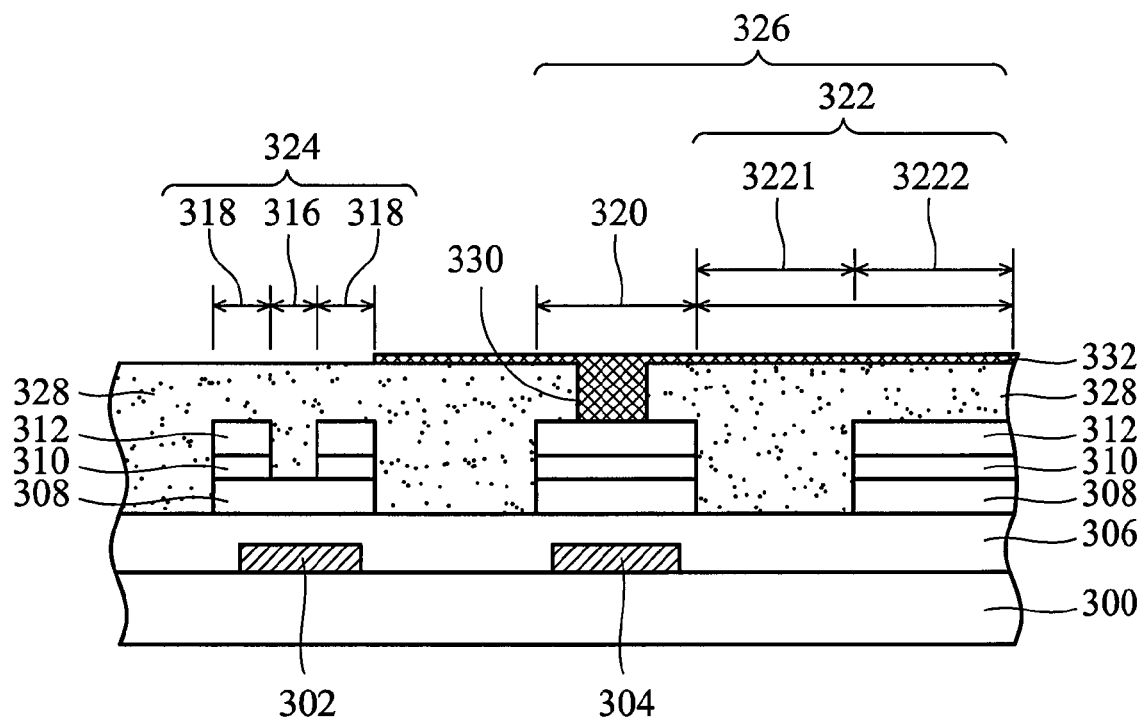
FIG. 3 is a schematic view of another embodiment of a liquid crystal display.

FIG. 3 depicts another embodiment of the transflective liquid crystal display. A substrate 300 is provided. A primitive metal layer (not shown) is formed on the substrate 300 by deposition. The primitive metal layer is patterned by photolithography and etching to form a gate line 302 and a storage capacitor line 304. Next, a gate dielectric layer 306, an active layer 308, a doped layer 310 and a metal layer 312 are formed on the substrate 300, the gate line 302 and the storage capacitor line 304 sequentially by deposition. The gate dielectric layer 306 can be silicon oxide, silicon nitride, silicon oxynitride, the combination thereof or a stacked layer thereof. The active layer 308 can comprise semiconductor, such as silicon or germanium. The doped layer 310 can be a doped semiconductor, such as an n-type polysilicon doped with phosphorous or an n-type polysilicon doped with arsenic. The metal layer 312 can be monolayer, such as comprising Al, Mo, or an alloy, such as AlNd, or multiple layers, such as Ti/Al, TiN/Al, Mo/Al or Ti/AlNd. Preferably, the metal layer 312 is a stacked layer of TiN/Al.

Next, as shown in FIG. 3, the active layer 308, the doped layer 310 and the metal layer 312 are etched. The liquid crystal display structure comprises a thin transistor area 324 and a pixel area 326.

The thin transistor area 324 comprises a channel region 316 and a source/drain region 318. The channel region 316 is an opening in which the doped layer 310 and the metal layer 312 is removed by an etching method to reveal the active layer 308.

The pixel area 326 comprises a contact portion 320 and a transflective portion 322. The transflective portion 322 comprises a transmittance region 3221 and a metal portion 3222. The metal layer 312, the doped layer 310 and the active layer 308 in the transmittance region 3221 are removed by etching. The metal layer 312 in the metal portion 3222 is as thick as the metal layer 312 in the contact portion 320. The incident light reaching the transmittance region 3221 passes through substrate 300, and the incident light reaching the metal portion 3222 is reflected by the metal layer 312. In this way, part of the incident light passes through the substrate 300 and part of the incident light is reflected.

Next, a passivation layer 328 (silicon nitride layer) is formed by deposition (chemical vapor deposition or plasma enhanced chemical vapor deposition) to overlay the gate dielectric layer 306, the etched metal layer 312 and the active layer 308. The passivation layer 328 is patterned by conventional photolithography and etching process to form an opening 330 in the contact portion 320. A pixel electrode layer, such as ITO, is formed on the passivation layer 228 and filled in the opening 330 for electrical connection. Finally, the pixel electrode layer is patterned to act as the pixel electrode 332 of the liquid crystal display.

In the described structure, as the metal layer 312 reflecting incident light is disposed between the substrate 300 and the pixel electrode 332, incident light does not pass through the substrate 300. The aberration problem can be avoided.

Figure 4:
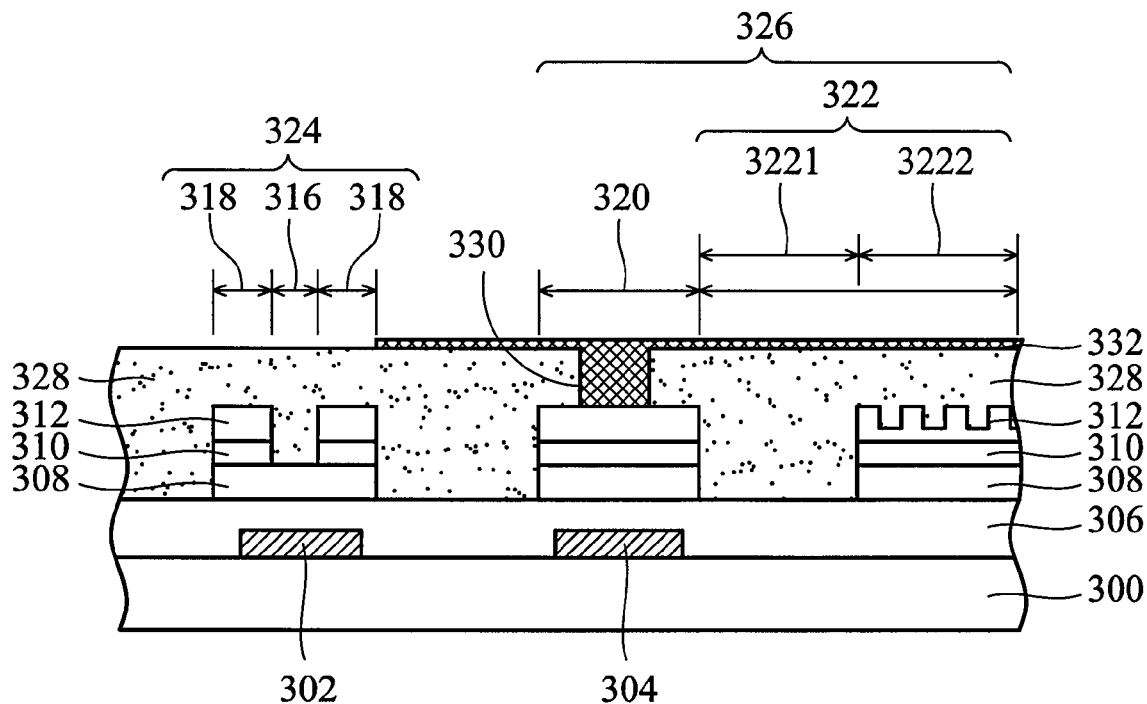
FIG. 4 is a schematic view depicting the tooth shaped surface of the metal layer of the liquid crystal display.

In this embodiment, the surface of the metal layer 312 in the metal portion 3222 can be tooth-shaped to scatter the incident light in various directions as shown in FIG. 4. The width and depth of the teeth are determined according to requirement.

Figure 5:
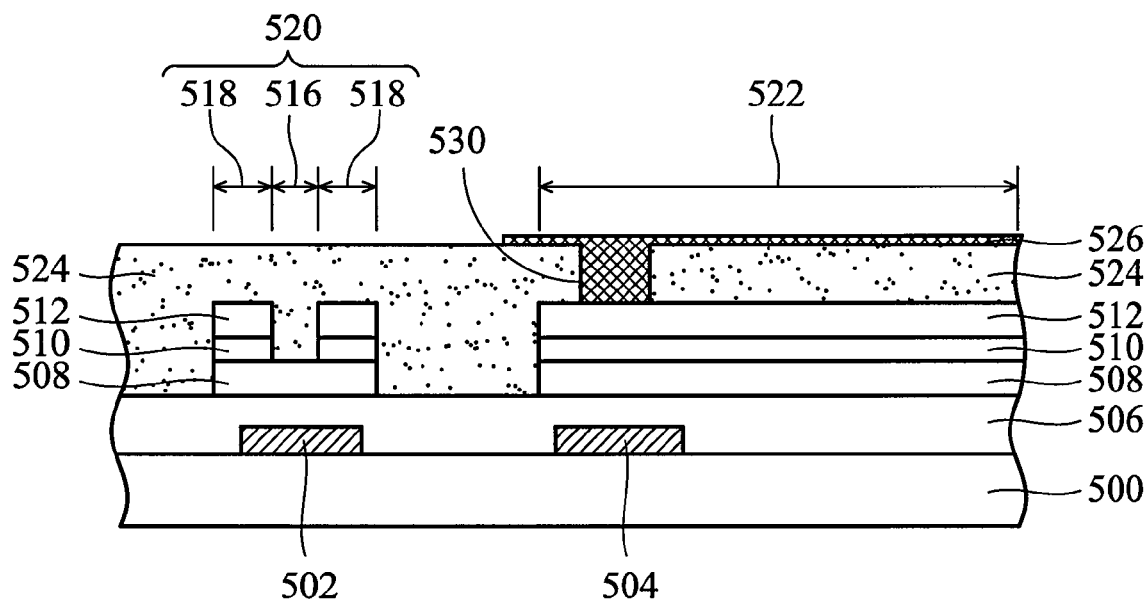
FIG. 5 is a schematic view of another embodiment of a liquid crystal display.

FIG. 5 depicts another embodiment of the transflective liquid crystal display. A substrate 500 is provided. A primitive metal layer (not shown) is formed on the substrate 500 by deposition. The primitive metal layer is patterned by photolithography and etching to form gate line 502 and storage capacitor line 504. Next, a gate dielectric layer 506, an active layer 508, a doped layer 510 and a metal layer 512 are formed on the substrate 500, the gate line 502 and the storage capacitor line 504 sequentially by deposition.

Next, as shown in FIG. 5, the active layer 508, the doped layer 510 and the metal layer 512 are etched. The liquid crystal display structure comprises a thin transistor area 520 and a pixel area 522.

The thin transistor area 520 comprises a channel region 516 and a source/drain region 518. The channel region 516 is an opening in which the doped layer 510 and the metal layer 512 is removed by an etching method to reveal the active layer 508.

Next, a passivation layer 528 (silicon nitride layer) is formed by deposition (chemical vapor deposition or plasma enhanced chemical vapor deposition) to overlay the gate dielectric layer 506, the etched metal layer 512 and the active layer 508. The passivation layer 528 is patterned by a conventional photolithography and etching process to form an opening 530 in the contact portion 520. A pixel electrode layer, such as ITO, is formed on the passivation layer 528 and filled in the opening 530 for electrical connection. Finally, the pixel electrode layer is patterned to act as the pixel electrode 532 of the liquid crystal display. Thus, the amount of incident light reaching the pixel area 522 is totally reflected.

The surface of the metal layer of the embodiment can also be tooth-shaped to scatter the incident light.

While the invention has been described by way of example and in terms of preferred embodiment, it is to be understood that the invention is not limited thereto. To the contrary, it is intended to overlay various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising:
    a substrate comprising a thin film transistor area and a pixel area;
    a gate line formed on the substrate;
    a gate dielectric layer formed on the gate line and the substrate;
    an active layer formed on the gate dielectric layer;
    a doped layer formed on the active layer;
    a metal layer formed on the doped layer, wherein the gate line, the gate dielectric layer, the active layer, the doped layer and the metal layer in the thin film transistor area constitute a thin film transistor, and the metal layer in the pixel area comprises a contact portion and a metal portion which is thick enough to partially transmit and partially reflect incident light to form a transflective region;
    a passivation layer overlaying the thin film transistor area and the pixel area; and
    a pixel electrode layer formed on the passivation layer.

2. The liquid crystal display as claimed in claim 1, wherein the thin film transistor area comprises a source/drain region and a channel region in which the passivation layer is formed directly on the active layer by etching the metal layer and the doped layer.

3. The liquid crystal display as claimed in claim 1, wherein the passivation layer has an opening formed on the contact portion to reveal the metal layer, and the pixel electrode layer is formed directly on the metal layer in the opening.

4. The liquid crystal display as claimed in claim 3, wherein the metal layer in the metal portion is thinner than the metal layer in the contact portion.

5. The liquid crystal display as claimed in claim 4, wherein the metal layer comprises a first metal layer and a second metal layer, and the second metal layer in the metal portion is removed by etching.

6. The liquid crystal display as claimed in claim 5, wherein the first metal layer comprises Ti, TiN and Mo, and the second metal layer comprises Al or AlNd.

7. The liquid crystal display as claimed in claim 4, wherein the metal layer in the source/drain region is as thick as the metal layer in the contact region.

8. The liquid crystal display as claimed in claim 4, wherein a surface of the metal layer in the transflective region is tooth-shaped.

9. The liquid crystal display as claimed in claim 1, wherein the substrate is a glass substrate.

10. The liquid crystal display as claimed in claim 1, wherein the metal layer comprises Al, Mo, Ti/Al, TiN/Al, Mo/Al, Ti/Al/TiN or Ti/AlNd.

11. The liquid crystal display as claimed in claim 1, wherein the active layer comprises silicon or germanium.

12. A liquid crystal display, comprising:
    a substrate comprising a thin film transistor area and a pixel area, wherein the pixel area comprises a contact region, a transmissive region, and a reflective region;
    a gate line formed on the substrate;
    a gate dielectric layer formed on the gate line and the substrate;
    an active layer formed on the gate dielectric layer;
    a doped layer formed on the active layer;
    a metal layer formed on the doped layer, wherein the gate line, the gate dielectric layer, the active layer, the doped layer and the metal layer in the thin film transistor area constitute a thin film transistor, and the metal layer in the pixel area is formed in the contact region and the reflective so that the gate dielectric layer in the transmissive region is revealed and the metal layer in the reflective region is thick enough to reflect incident light;
    a passivation layer overlaying the thin film transistor area and the pixel area; and
    a pixel electrode layer formed on the passivation layer.

13. The liquid crystal display as claimed in claim 12, wherein the metal layer in the reflective region is as thick as the metal layer in the contact portion.

14. The liquid crystal display as claimed in claim 12, wherein the surface of the metal layer in the reflective region is tooth-shaped.

15. The liquid crystal display as claimed in claim 12, wherein the substrate is a glass substrate.

16. The liquid crystal display as claimed in claim 12, wherein the metal layer comprises Al, Mo, Ti/Al, TiN/Al, Mo/Al, Ti/Al/TiN or Ti/AlNd.

17. The liquid crystal display as claimed in claim 12, wherein the active layer comprises silicon or germanium.

18. A liquid crystal display, comprising:
    a substrate comprising a thin film transistor area and a pixel area;
    a gate line formed on the substrate;
    a gate dielectric layer formed on the gate line and the substrate;
    an active layer formed on the gate dielectric layer;
    a doped layer formed on the active layer;
    a metal layer formed on the doped layer, wherein the gate line, the gate dielectric layer, the active layer, the doped layer and the metal layer in the thin film transistor area constitute a thin film transistor, and the metal layer in the pixel area comprises a contact portion and a metal potion which is thick enough to reflect incident light to form a reflective region;

a passivation layer overlaying the thin film transistor area and the pixel area; and a pixel electrode layer formed on the passivation layer.

19. The liquid crystal display as claimed in claim 18, wherein a surface of the metal layer in the reflective region is tooth-shaped.

20. The liquid crystal display as claimed in claim 18, wherein the substrate is a glass substrate.

21. The liquid crystal display as claimed in claim 18, wherein the metal layer comprises Al, Mo, Ti/Al, TiN/Al, Mo/Al, Ti/Al/TiN or Ti/AlNd.

22. The liquid crystal display as claimed in claim 18, wherein the active layer comprises silicon or germanium.

* * * * *